March 13, 1962 J. MALESKO 3,024,510
SELF-LOCKING ADJUSTABLE PIN
Filed Dec. 15, 1960 2 Sheets-Sheet 1
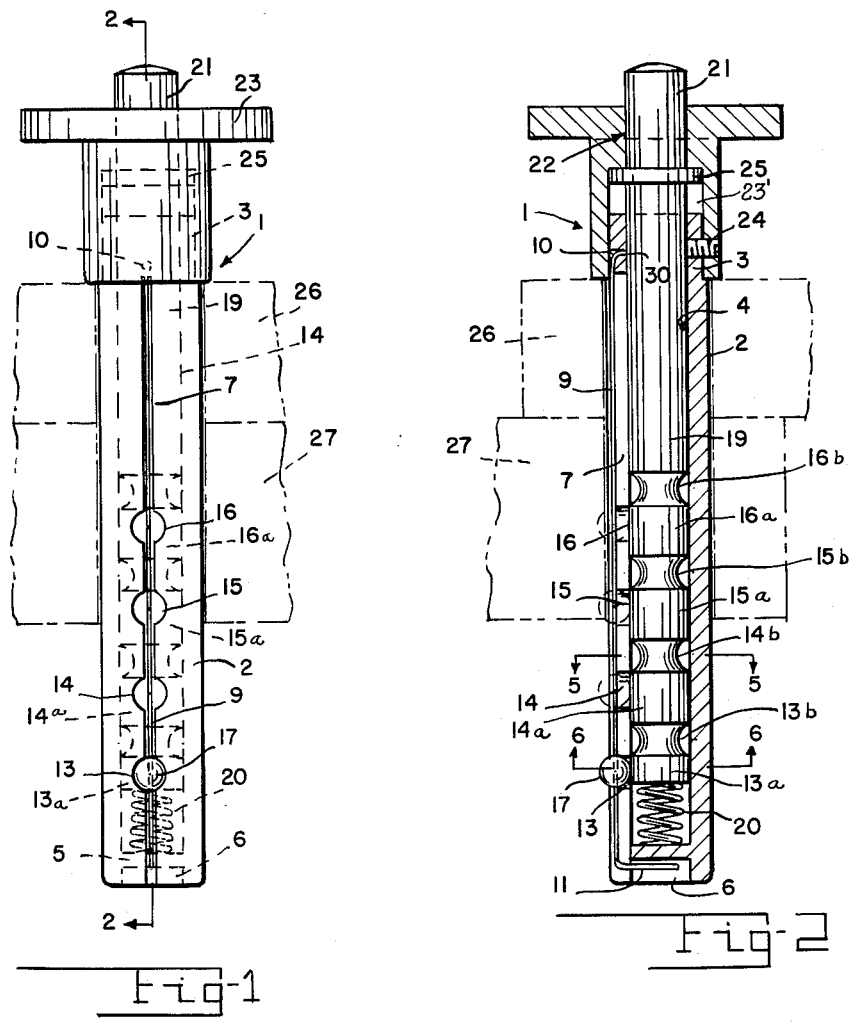
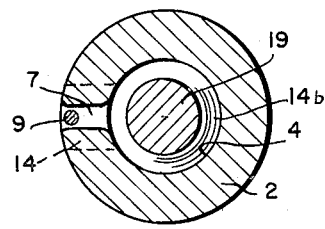
INVENTOR.
JOSEPH MALESKO
BY
ATTORNEYS March 13, 1962  J. MALESKO  3,024,510
SELF-LOCKING ADJUSTABLE PIN
Filed Dec. 15, 1960  2 Sheets-Sheet 2

INVENTOR.
JOSEPH MALESKO
BY
ATTORNEYS

3,024,510
SELF-LOCKING ADJUSTABLE PIN
Joseph Malesko, 1817 Brookline Ave., Dayton 20, Ohio
Filed Dec. 15, 1960, Ser. No. 76,079
6 Claims. (Cl. 24—211)
(Granted under Title 35, U.S. Code (1952), sec. 266)

The invention described herein may be manufactured and used by or for the United States Government for governmental purposes without payment to me of any royalty thereon.

This invention relates to improvements in fasteners, coupling pins, and the like, and more particularly to a quickly releasable locking pin adapted to be inserted through aligned apertures in plates, coupling members and the like, having detent means to prevent the removal of the pin from the apertures, and has for an object, improved adjustable detent means for adjusting the position of the detent to different distances between the head of the pin and its insertion end.

A further object includes the provision of easily accessible means for locking the detent means against inward release movement into the pin, and manual means accessible on the head of the pin for releasing the detent means for inward depression into the body of the pin.

A further object is the provision of a cylindrical locking pin having a plurality of detent receiving openings in one side thereof, spaced longitudinally with a common axially movable detent and detent holding or locking means for holding the detent in any of the openings against displacement and inward movement or depression therein, and manually operable release means on the head of the pin for displacing the axially movable detent holding means to permit the axially movable detent means to move inwardly farther into said openings, inside of the outer surface of the pin.

A further object is the provision of means on the resilient ball detent supporting wire to limit the outward displacement of the lower end thereof from the receiving groove in the body.

A still further object includes stop means at the lower end of the resilient ball detent supporting wire to prevent accidental removal of the ball detent from the wire.

Other and further objects and advantages will become apparent from the following description and accompanying drawings in which like reference characters refer to like parts in the several figures.

In the drawings:

FIG. 1 is a side elevational view of the improved adjustable detent locking pin incorporating the invention, a pair of plates or members to be secured together by the pin being shown in dot and dash lines;

FIG. 2 is a longitudinal sectional view taken about on the plane indicated by line 2—2 in FIG. 1;

Figure 6:
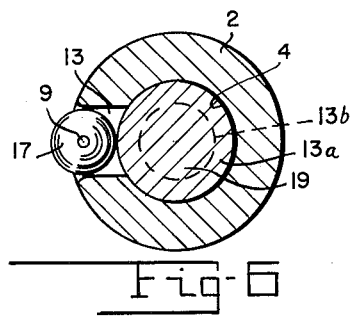

FIGS. 5 and 6, respectively, are transverse sectional views taken about on the planes indicated by lines 5—5, and 6—6 in FIG. 2.

In the drawings the reference numeral 1 denotes the improved adjustable self-locking pin generally, which comprises a tubular body portion 2, preferably cylindrical, having a reduced diameter upper end 3 and a cylindrical bore 4 therethrough closed at its lower end by a web or spring seating abutment 5, leaving a cylindrical recess 6 in the lower or entrance end 8 of the pin.

The cylindrical body portion 2 of the pin 1 is slotted or grooved longitudinally as at 7, from the reduced diameter top portion 3 to the insertion end 8 of the pin.

Figure 3:
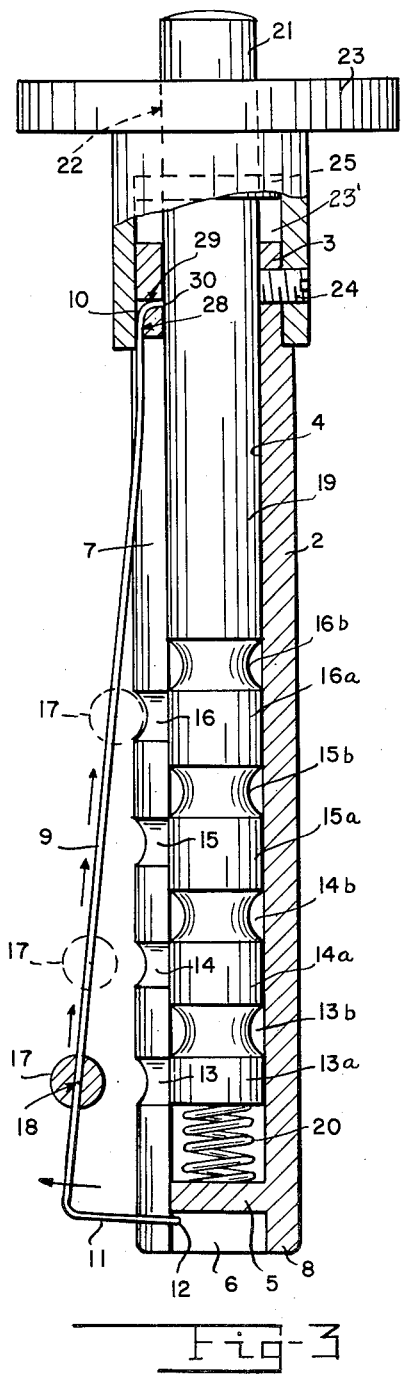
FIG. 3 is an enlarged sectional view taken about on the same plane as FIG. 2, showing the resilient supporting wire for the ball detent displaced from the groove for axial displacement and adjustment of the ball detent to different distances from the head portion of the pin.
Figure 4:
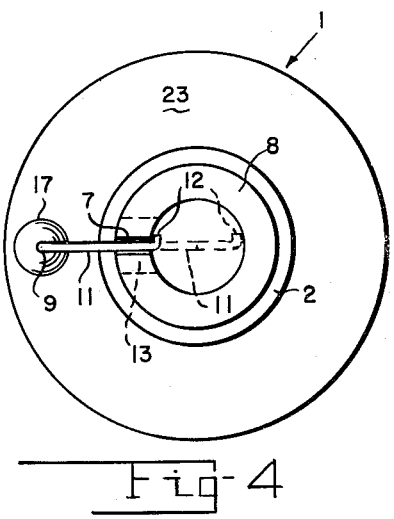
FIG. 4 is a bottom plan view of the locking pin as shown in FIG. 3.

A resilient detent supporting wire or spring rod 9 is suitably secured at 10 in the reduced end portion 3 in alignment with the groove or slot 7 so that it normally extends substantially centrally and longitudinally through the length of the groove 7 as seen in FIGS. 2, 3, 5 and 6, the lower end of the wire 9 being bent angularly at 11 so as to remain in the groove 7 below the abutment 5 when the lower end of the wire is pulled outwardly as seen in FIGS. 3 and 4, for purposes later described. If desirable the extremity of the laterally bent portion 11 of the wire 9 may have a further laterally bent extremity 12 to prevent accidental complete displacement of the lower end 11 from the groove 7.

At longitudinally, and preferably equally spaced points along the groove, the groove is widened by cylindrical detent receiving openings 13, 14, 15 and 16, these openings being circular and extending from the outer surface radially inward into the bore 4, as shown in FIGS. 3 and 6, to accommodate a detent ball member 17 which is slidable or axially adjustable along the resilient detent carrying wire 9, the ball detent member 17 having a guide passage or bore 18 to accommodate the wire 9.

The thickness of the wall of the tubular body 2 is considerably less than the diameter of the ball detent member 17 which easily fits the openings 13 to 16 so that when the surface of the ball detent is disposed flush with the inner bore 4 of the tubular body there is a considerable portion of the body of the ball detent member projecting outwardly beyond the outer surface of the body 2.

Slidable in the bore 4 is a locking pin 19, preferably solid, which is urged upwardly by a compression spring 20 inserted between the lower end of the locking pin or plunger 19 and the web or abutment 5.

The upper end 21 of the detent locking plunger 19 is received through a guide opening 22 in a flanged manipulating cap 23, the cap having a bore which snugly telescopes over the reduced end 3 of the body 2 and may be pinned or otherwise secured in place as shown by a suitable fastener 24.

The locking plunger 19 has an annular stop flange 25 disposed in the bore between the upper end of the reduced diameter upper end 3 and the cap or handle 23, limiting the up and down degree of movement of the locking plunger 19.

The upper protruding end 21 of the plunger forms a push button for manually depressing the plunger to its releasing position while the flange 25 striking the head or cap 23 under the influence of the spring 20 determines the upper or locking position of the plunger 19.

The plunger 19 is formed with a plurality of properly spaced cylindrical locking portions 13ª, 14ª, 15ª and 16ª, only slightly less than the diameter of the bore 4 which are respectively disposed immediately behind the detent receiving openings 13, 14, 15 and 16 when the locking plunger is in its raised locking position as shown in the drawings.

The plunger is also formed with annular detent receiving grooves 13ᵇ, 14ᵇ, 15ᵇ, and 16ᵇ immediately above the locking portions 13ª, 14ª, 15ª, and 16ª respectively for releasing the ball detent for inward depression when the same is disposed in any of the openings 13, 14, 15 and 16 and the locking plunger is fully depressed by downward pressure on the push button end 21 of the plunger 19.

The dot and dash elements shown in FIGS. 1 and 2 represent two elements 26 and 27 connected, or to be connected, together having aligned openings therein for receiving the improved coupling and locking pin 1, and they may be of different thicknesses and still the improved locking pin will secure the elements 26 and 27 together and retain the pin therein against appreciable vertical displacement.

When it is desired to adjust the detent to one of the upper openings, such as 15 or 16, to provide a shorter distance between the head 21 and the locking detent 17 the lower end 11 of the resilient detent holding slide wire 9 is pulled outwardly, as shown in FIG. 3, displacing the locking detent ball 17 entirely out of any of the openings 13 to 16, whereupon the detent may be slid along the wire to a point opposite the desired opening, 14, 15 or 16, and then released and the resiliency of the wire 9 will retract the wire back again into the groove 7, carrying the ball detent into the selected receiving opening 13, 14, 15 or 16.

In order to insert the pin device through the plates or other coupling members 26 and 27 it is necessary to depress the locking plunger 19 to dispose the ball detent receiving grooves 13b, 14b, 15b, and 16b behind the respective openings 13, 14, 15 and 16 and insertion of the device through the provided apertures in the plates will depress the detent 17 inwardly under the resilient resistance of the supporting spring wire 9.

The upper end of the spring wire 9 is firmly secured in the reduced portion 3 by any suitable means, such as shown in FIGS. 2 and 3, in which a longitudinal groove 28 is provided in the periphery of the reduced portion 3 to receive the wire, and at the end of the groove is provided a recess 29 or opening to receive the bent end 30 of the wire, the internal bore 23' of the cap 23 securely holding the upper end of the resilient wire 9 in position so that the remainder of the wire is held centered in the groove 7 and across the respective openings 13, 14, 15 and 16. When release is desired the plunger 21—19 is depressed and upon upward withdrawal of the pin the detent is or can be depressed to the outer surface of the body as it passes out of the coupling openings in the coupling elements 26 and 27.

Having thus disclosed the invention it is not desired to be limited to the precise construction as shown, but instead it is intended to cover those modifications and changes which occur to those skilled in the art from my disclosure and which fairly fall within the scope and spirit of the invention as defined in the appended claims.

I claim:

1. An adjustable detent locking pin comprising a tubular body having an enlarged head, an insertion end, and a bore extending longitudinally therethrough, said body having a longitudinal opening in one side thereof extending from said head to said insertion end and formed with a plurality of longitudinally spaced locking detent receiving openings therein extending through said longitudinal opening from the exterior of the body into said bore and spaced at different distances from said head, a flexible resilient detent supporting wire fixed at one end only to said head and extending longitudinally in said longitudinal opening across said detent receiving openings to the insertion end of the body, a detent member slidably mounted on said supporting wire for longitudinal adjustment and reception into any one of the said detent receiving openings, said detent member dimensioned relative to said detent receiving openings to exceed the length of any of said detent receiving openings from the outer surface of the body to said bore, an elongated detent locking and release plunger slidably fitting said bore for longitudinal movement therein between a detent member locking position and a detent member release position, means between said detent locking plunger and said body for moving said plunger in said bore to one of said positions, and manually operable means on said head for moving said locking plunger to the other of said positions, said detent locking plunger having a detent locking abutment in said bore behind each of said detent receiving openings when said plunger is moved to one of its two positions and formed with a detent receiving depression at the same side of each of the abutments movable with the plunger in the bore behind each of said detent receiving openings to receive a portion of said detent member therein to permit the detent member to move inwardly therein to permit movement of the detent member entirely into said body when the detent member is disposed in any of the detent receiving openings in the body and the locking plunger is moved to its other position.

2. An adjustable detent locking pin comprising a cylindrical body having an enlarged head at one end, an opposite insertion end, and a cylindrical bore extending longitudinally therethrough, said body having a narrow elongated slot in one side thereof extending longitudinally from said head toward said insertion end and a plurality of longitudinally spaced cylindrical locking detent receiving openings therein extending through said longitudinal slot from the exterior of the body into said bore at spaced different distances from said head, a flexible resilient detent supporting wire fixed at one end only in said head and extending longitudinally within said longitudinal slot across all of said detent receiving openings, substantially to said insertion end, and terminating in an outwardly displaceable opposite free end, a spherical detent locking member slidably mounted on said supporting wire for longitudinal adjustment and insertion into any one of said detent receiving openings when the free end of said wire is displaced outwardly of said slot, said spherical locking detent member having a diameter for easy reception into any of said detent receiving openings which exceeds the length of said detent receiving openings from the periphery of the body to said cylindrical bore to project materially radially beyond the surface of the cylindrical body when the opposite side of said spherical detent member is flush with the periphery of said bore, a cylindrical detent locking plunger slidably fitting said cylindrical bore for movement between a detent locking position toward said head and a detent release position toward said insertion end, spring means between said plunger and said body for moving said locking plunger to said locking position, said plunger having an actuating extension projecting through said head for manually moving said plunger to said release position, said detent locking plunger having a plurality of spaced annular detent locking abutments in said bore disposed for blocking movement behind each of said detent receiving openings when said plunger is moved to its locking position, to prevent inward movement of said spherical detent member when said detent member is disposed in any one of said detent receiving openings, said plunger having an equal number of annular detent receiving grooves therein, each groove next to one of said abutments in a direction toward said actuating extension end of said plunger for disposition behind each of said detent receiving openings, when said actuating extension is depressed to move said plunger to its release position, to permit the spherical detent member to move inwardly within the periphery of the cylindrical body into one of the grooves.

3. An adjustable elongated detent locking pin comprising a cylindrical body having an enlarged head at its upper end and an insertion end at its lower end, and having a concentric cylindrical bore therethrough and formed with a plurality of cylindrical detent receiving openings spaced longitudinally along one side of said body extending from the outer surface of said body into said bore and a slot extending longitudinally in said body from said head diametrically across all of said detent receiving openings to said lower insertion end, a spherical detent locking member insertable in and passable through any of said detent receiving openings to project from the surface of the bore materially outward beyond the outer surface of the body and having a wire receiving passage extending diametrically therethrough, a resilient flexible detent adjusting supporting wire fixed in said head and extending longitudinally of said body in said slot and through said passage in said detent member and having a free end at the insertion end of the body for outward displacement of said wire out of said slot and said detent receiving openings to permit longitudinal adjustment of said detent member along said wire into any one of said plurality of spaced detent receiving openings, a cylindrical detent locking and release plunger slidably fitting said bore for movement toward said head to a detent locking position and movable toward said insertion end to a detent release position, stop means on said plunger disposed for plunger movement limiting engagement with said head and body between said locking and releasing positions, spring means between said plunger and said body for moving said plunger to said locking position, said plunger having a push button extension extending through said head beyond the same for manually depressing said plunger to said release position, said plunger having an annular detent member receiving groove for each of said detent receiving openings formed therein for disposition above each of said detent openings when said plunger is disposed in its locking position, the body of the plunger below each of said grooves forming blocking means to block the inward movement of the detent member into said bore when the detent member is disposed in any of the detent receiving openings and said plunger is disposed in detent locking position, said detent receiving grooves being formed in said plunger to lie immediately behind said detent receiving openings when said plunger is moved to its release position to permit said detent member to move inwardly below the outer surface of the body when the detent member is disposed in any of said detent receiving openings.

4. An adjustable elongated detent locking pin as set forth in claim 3, in which the lower free end of the detent supporting wire is bent inwardly to extend through said slot at the insertion end of the body to prevent lateral displacement in opposite directions of the free end of said detent supporting wire when said free end of the wire is displaced outwardly out of said slot to permit the detent member to be adjusted along the wire for insertion into any of the detent receiving openings in the body.

5. An adjustable detent locking pin as set forth in claim 4 for securing plates and the like of different thicknesses together, in which the extremity of the laterally bent portion of said detent supporting wire disposed in the body is formed with a stop portion to prevent said laterally bent extremity from passing through said slot, to prevent the lower end of said wire from being displaced more than a predetermined distance away from the insertion end of said body.

6. Apparatus as claimed in claim 5 in which said body has a reduced cylindrical extension and said enlarged head telescopes over the reduced extension and provides means for fixing said wire in said slot parallel in spaced relation to the walls of the slot and within the periphery of the cylindrical body, and includes means for securing the head in fixed relation on said reduced cylindrical extension.

References Cited in the file of this patent

FOREIGN PATENTS 554,307    Great Britain ---------- June 29, 1943